US011325727B2

(12) United States Patent
Longmier et al.

(10) Patent No.: US 11,325,727 B2
(45) Date of Patent: May 10, 2022

(54) CONVERGING/DIVERGING MAGNETIC NOZZLE

(71) Applicant: THE REGENTS OF THE UNIVERSITY OF MICHIGAN, Ann Arbor, MI (US)

(72) Inventors: Benjamin Longmier, Ann Arbor, MI (US); John Patrick Sheehan, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 0 days.

(21) Appl. No.: 14/914,056

(22) PCT Filed: Aug. 27, 2014

(86) PCT No.: PCT/US2014/052856
§ 371 (c)(1),
(2) Date: Feb. 24, 2016

(87) PCT Pub. No.: WO2015/031447
PCT Pub. Date: Mar. 5, 2015

(65) Prior Publication Data
US 2016/0200458 A1 Jul. 14, 2016

Related U.S. Application Data

(60) Provisional application No. 61/870,444, filed on Aug. 27, 2013.

(51) Int. Cl.
*B64G 1/40* (2006.01)
*F03H 1/00* (2006.01)

(52) U.S. Cl.
CPC ............. *B64G 1/405* (2013.01); *B64G 1/402* (2013.01); *F03H 1/0093* (2013.01)

(58) Field of Classification Search
CPC ........... H01J 37/32082; H01J 37/32092; H01J 27/18; B64G 1/405; F03H 1/00; F03H 1/0018; F03H 1/0081; F03H 1/12; H05H 1/54; H05H 13/00
See application file for complete search history.

(56) References Cited

U.S. PATENT DOCUMENTS

| 4,548,033 A | 10/1985 | Cann |
| 4,909,914 A | 3/1990 | Chiba et al. |
| 4,978,071 A | 12/1990 | MacLean et al. |

(Continued)

FOREIGN PATENT DOCUMENTS

| WO | 2008100642 A2 | 8/2008 |
| WO | 20150031447 A1 | 3/2015 |

OTHER PUBLICATIONS

Jacobson "Development of VASMIR Helicon Source" 2001.*

(Continued)

*Primary Examiner* — Arun Goyal
*Assistant Examiner* — William L Breazeal
(74) *Attorney, Agent, or Firm* — Harness, Dickey & Pierce, P.L.C.

(57) ABSTRACT

A magnetic nozzle having a converging/diverging contour shape that converts the thermal energy of a propellant into directed kinetic energy, but uses magnetic fields instead of a physical boundary to direct the flow of particles.

18 Claims, 5 Drawing Sheets

(56) References Cited

U.S. PATENT DOCUMENTS

| | | | |
|---|---|---|---|
| 5,339,623 A | | 8/1994 | Smith |
| 6,293,090 B1 * | | 9/2001 | Olson .................. F03H 1/0081 |
| | | | 313/231.31 |
| 6,449,941 B1 | | 9/2002 | Warboys et al. |
| 7,498,592 B2 | | 3/2009 | Hershkowitz et al. |
| 7,679,025 B1 | | 3/2010 | Krishnan et al. |
| 7,875,867 B2 | | 1/2011 | Hershkowitz et al. |
| 2006/0064984 A1 | | 3/2006 | Gratton et al. |
| 2008/0093506 A1 | | 4/2008 | Emsellem et al. |
| 2009/0166554 A1 * | | 7/2009 | Radovanov ............ H01J 27/08 |
| | | | 250/424 |
| 2010/0213851 A1 * | | 8/2010 | Chang Diaz .......... F03H 1/0093 |
| | | | 315/111.41 |
| 2012/0080148 A1 * | | 4/2012 | Zhang ................... H01J 37/08 |
| | | | 156/345.3 |
| 2013/0067883 A1 | | 3/2013 | Emsellem et al. |

OTHER PUBLICATIONS

Kikuchi "Plasma Production and Wave Propagation in a Plasma Source Using Lower Hybrid Waves" 2009.*
Gerwin "Integrity of the Plasma Magnetic Nozzle" 2009.*
Power "Development of a High Power Microwave Thruster, With a Magnetic Nozzle, for Space Applications" (Year: 1989).*
Takahashi "Ion acceleration in a solenoid-free plasma expanded by permanent magnets" (Year: 2008).*
Chabert "Physics of Radio Frequency Plasmas" (Year: 2011).*
Boswell "Very efficient plasma generation by whistler waves near the lower hybrid frequency" (Year: 1984).*
Blackwell "Two-dimensional imaging of a helicon discharge" (Year: 1997).*
Plihon "Experimental investigation of double layers in expanding plasmas" (Year: 2006).*
Wikipedia "Double Layer" (Year: 2020).*
Bering "Observations of single-pass ion cyclotron heating in a trans-sonic flowing plasma" (Year: 2010).*
International Search Report and Written Opinion for PCT/US2014/052856, dated Dec. 12, 2014; ISA/KR.
Longmier, "Ambipolar Ion Acceleration in the Expanding Magnetic Nozzle of the VASIMR VX-200i," 2009.
Porte, "Superiority of Half Wavelength Helicon Antenna," 2003.
International Search Report and Written Opinion for PCT/US2014/052861, dated Dec. 12, 2014; ISA/KR.
Cohen, "Ion Acceleration in Plasmas Emerging from a Helicon-Heated Magnetic-Mirror Device," Physics of Plasmas, 2003.
Charles, "Current-Free Double-Layer Formation in a High-Density Helicon Discharge," Applied Physics Letters, 2003.
Sun, "Parallel Velocity and Temperature of Argon Ions in an Expanding, Helicon Source Driven Plasma," Plasma Sources Science and Technology, 2004.
Charles, "Plasmas for Spacecraft Propulsion," Journal of Physics D: Applied Physics, 2009.
Charles, "Axial Force Imparted by a Conical Radiofrequency Magneto-Plasma Thruster," Applied Physics Letters, 2012.
Pavarin, D. et al., "Design of 50 W Helicon Plasma Thruster," The 31st International Electric Propulsion Conference, University of Michigan, USA (IEPC-2009-205), Sep. 20-24, 2009.
Longmier B. et al., "A Large Delta-V Plasma Thruster for Nanosatellites" Interplanetary Small Satellite Conference, 2014, 24 pages.
Longmier B. et al., "Ambipolar Ion Acceleration in a 20,000 G Magnetic Nozzle" 2013 Abstracts IEEE International Conference on Plasma Science, Jun. 2013, 17 pages.
Longmier B. et al., "Ambipolar ion acceleration in an expanding magnetic nozzle" Plasma Sources Science and Technology, Jan. 2011, 9 pages.
Yildiz M. et al., "Global Energy Transfer Model of Microwave Induced Plasma in a Microwave Electrothermal Thruster Resonant Cavity" Joint Conference of 30th International Symposium on Space Technology and Science, Jul. 2015, 10 pages.
Final Office Action for U.S. Appl. No. 14/914,065, filed Feb. 24, 2016; dated Apr. 4, 2019 17 pages.
Final Office Action for U.S. Appl. No. 14/914,065, filed Feb. 24, 2016; dated Oct. 6, 2020 30 pages.
Final Office Action for U.S. Appl. No. 14/914,065, filed Feb. 24, 2016; dated Oct. 2, 2017 28 pages.
Non-Final Office Action for U.S. Appl. No. 14/914,065, filed Feb. 24, 2016; dated Dec. 12, 2019 19 pages.
Non-Final Office Action for U.S. Appl. No. 14/914,065, filed Feb. 24, 2016; dated Dec. 14, 2016 14 pages.
Non-Final Office Action for U.S. Appl. No. 14/914,065, filed Feb. 24, 2016; dated Jun. 13, 2018 18 pages.
International Symposium on Space Technology and Science, dated Jul. 2015, 10 pages.
Non-Final Office Action for U.S. Appl. No. 14/914,065, filed Feb. 24, 2016; dated Jun. 11, 2021 30 pages.

* cited by examiner

Fig-8

CONVERGING/DIVERGING MAGNETIC NOZZLE

CROSS-REFERENCE TO RELATED APPLICATIONS

This application claims the benefit of U.S. Provisional Application No. 61/870,444, filed on Aug. 27, 2013. The entire disclosure of the above application is incorporated herein by reference.

FIELD

The present disclosure relates to converging/diverging nozzles and, more particularly, relates to a converging/diverging magnetic nozzle employing magnetic fields generated by permanent magnets to define a converging/diverging flow structure.

BACKGROUND AND SUMMARY

This section provides background information related to the present disclosure which is not necessarily prior art. This section further provides a general summary of the disclosure, and is not a comprehensive disclosure of its full scope or all of its features.

Small satellites are changing the nature of spacecraft and space-based science. Their smaller size (less than or equal to 750 kg) allows them to be developed at a lower cost and on a more rapid development cycle. Nanosatellites (about 1 to about 10 kg) in particular have caught the attention of scientific and commercial entities alike for a wide range of tasks from imagery to space weather. The rapid emergence of nanosatellites has spawned the need for primary propulsion in these spacecraft. Chemical propulsion requires far more propellant mass than can be stored in such a small craft while conventional electric propulsion devices such as Hall thrusters and ion engines lose effectiveness when scaled down. This technological gap requires a new sort of electric propulsion device designed to be small (less than about 1000 cm3), low mass (less than about 1 kg), and low power (less than about 50 W). The CubeSAT Ambipolar Thruster (CAT) described in connection with the principles of the present teachings is designed specifically to fulfill these requirements.

Since their introduction about 10 years ago, CubeSATs and their P-POD deployers have come to be the dominant nanosatellite design. A single CubeSAT unit (U) is a cube with 10 cm sides with satellites consisting of some multiple or fraction of U's (1 U, 0.5 U, 3 U, etc.). P-PODs are the deployment hardware that is attached to the launch vehicle, typically as secondary payload. It is specifically designed to protect the launch vehicle and primary payload while delivering the CubeSAT(s) safely into orbit. Because of the adoption of this standard, construction costs have been reduced, standardized hardware can be manufactured, and flight heritage can be established across the many programs that use CubeSATs. These programs include those of industry, universities, and countries without large space programs as well as large budget agencies such as NASA and the ESA.

CubeSAT propulsion is less advanced than other nanosatellite technologies because of the difficulties in miniaturizing conventional thruster designs. Monopropellant and bipropellant systems exist or are in development with thrusts less than about 1 N and small $\Delta V$ capabilities of 10 s of m/s. For moderate $\Delta V$s (>100 m/s), electric propulsion is needed. A wide variety of electric thrusters are in development, with predicted $\Delta V$ capabilities up to 300 m/s. These thrusters will be suitable for station keeping, formation flying, and deorbiting.

With a thruster capable of providing large $\Delta V$ (>1 km/s) to a CubeSAT, a huge variety of new missions would become available. They would no longer be restricted to the orbit of the launch vehicle but could maneuver themselves into highly elliptical orbits, geostationary orbit, or polar orbits. With enough $\Delta V$, CubeSATs could reach the Earth-Moon or Earth-Sun Lagrange points. Significant cost savings would come from being able to deploy an array of satellites from a single launch vehicle, fanning them out to create a global network. Other possibilities include cluster formation flying and long-lived low altitude orbits.

In order to provide the necessary structure for such thruster systems, the present teachings set forth one aspect of the present system, namely a magnetic nozzle system.

Figure 1:
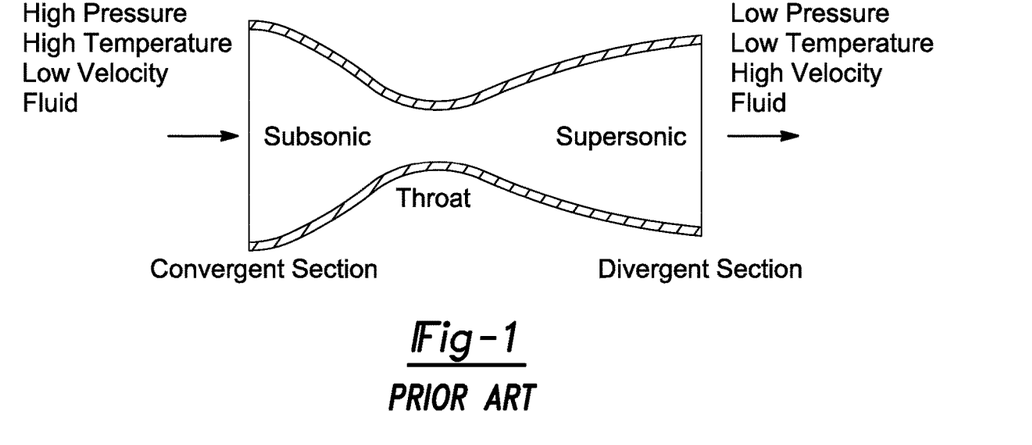
FIG. 1 shows a traditional de Laval Nozzle concept.

According to the principles of the present teachings, the magnetic nozzle system is provided that defines a magnetic field structure equivalent to a physical de Laval nozzle (see FIG. 1). In a de Laval nozzle thermal energy of an impinging gas is converted into directed kinetic energy in the converging subsonic region. In the throat of the nozzle, the propellant is accelerated to the sound speed of the gas (i.e. the sonic speed, or Mach 1). As the propellant continuous through a diverging section of a de Laval nozzle, it accelerates to super-sonic velocities (Mach>1). According to the present teachings, a magnetic nozzle generated by permanent magnets uses the same converging/diverging contour shape to convert the thermal energy of a propellant into directed kinetic energy, but uses magnetic fields instead of a physical boundary to direct the flow of plasma (as opposed to hot gases).

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Helicons are highly efficient plasma sources that are being explored for application in plasma propulsion. The Variable Specific Impulse Magnetoplasma Rocket (VASIMR) is a 200 kW thruster that uses a helicon plasma source to heat the electrons and ion cyclotron resonance to heat the ions, both of which expand through a magnetic nozzle to produce thrust. This device has been designed for a next generation of spacecraft, being approximately 2 m long and requires far more power than conventional spacecraft can generate. Laboratory helicons typically require power in the low kW range, which is on par with many established Hall thrusters and ion engines, and various groups have begun developing helicon thrusters on this scale. A miniature helicon thruster is currently in development which uses only 10 s of W of power and has approximate performance parameters of 1 mN of thrust, 1000 s Isp, and 20% efficiency.

Helicon waves are bounded whistler waves, an electromagnetic plasma wave, which requires an externally applied magnetic field to propagate. They were discovered to be exceptionally good at coupling RF energy into a plasma to heat electrons and ionize neutrals, able to reach higher densities than capacitive or inductively coupled plasmas, making them useful as plasma sources. It is a low frequency wave ($\omega \ll \omega_c$, where $\omega$ is the wave frequency, $\omega_c = eB/m_e$ electron cyclotron frequency, e is the elementary charge, B is the magnetic flux, and $m_e$ is the electron mass) so frequencies are typically industrial values of 6.78, 13.56, or 27.12 MHz. The helicon dispersion relation at low frequency describes the wave's propagation in a plasma $$\frac{c^2 k^2}{\omega^2} = \frac{\omega_p^2}{\omega \omega_c \cos\theta} \tag{1}$$

where c is the speed of light, k is the wave number magnitude, $$\omega_p = \sqrt{\frac{n_e e^2}{\epsilon 0 m_e}}$$

is the plasma frequency, ne is the electron number density, $\epsilon 0$ is the permittivity of free space, and $\theta$ is the angle between $\vec{k}$ and $\vec{B}$. The wave number can be decomposed into perpendicular and parallel components with respect to the magnetic field: $k^2 = k_\perp^2 + k_\parallel^2$. The perpendicular wave number depends only on the radius of the cylindrical discharge channel and the parallel wave number can be set by a proper antenna choice. Thus, for a system that fixes the RF frequency and the wave number, the density is proportional to the magnetic field strength, a result that has been validated often in experiments.

CAT was designed for use on a 3U CubeSAT based on the Radio Auroral Explorer (RAX) or CubeSAT investigating Atmospheric Density Response to Extreme driving (CADRE) bus, though it is suitable for almost any 3U CubeSAT bus. The thruster itself was to be 1U or less, leaving 1U for propellant and 1 U for spacecraft systems. This involved ensuring that the thruster was less than 1 kg. Due to the design of the P-POD deployer, there is some additional room inside where the deployment spring is curled. This so-called "tuna can" can allow the thruster to protrude slightly (up to 3.5 cm) outside of the standard 3U shape.

The RAX spacecraft design has a solar system 22 having four solar panels which generate a maximum of 7.0 or 8.1 W per panel, depending on the type of panel, and a 4.2 Ahr battery pack. By charging the battery when the solar panels are illuminated by the sun the battery can sustain the spacecraft when it is shadowed by the earth. This power architecture can be used to CAT's advantage in certain missions. For instance, to raise the orbit apogee and increase the orbit eccentricity CAT can be fired near perigee during only a fraction of the orbit. In this way, CAT can operate at higher power than could be continuously provided by the solar panels. For this reason the nominal operating power of CAT was designed to be 10 to 50 W, though larger operating power levels are possible, with demonstrations of up to 200 W with argon propellant.

The design starting point of CAT was the power. As an example, assume that 50 W gets deposited into the plasma by the antenna. Helicons are capable of producing nearly fully ionized plasmas and it takes some amount of energy per ion (called the ion cost, W) to sustain the discharge. This energy is an empirical number that accounts for ionization energy, wall losses, radiation, and all other energy sinks. The power balance equation can be written as $$P = \frac{\dot{m}}{M} N_a W \quad (2)$$

Where P is power, $\dot{m}$ is mass flow rate, M is the molecular weight of the propellant, and $N_a$ is Avogadro's number. Using the ideal gas law, the mass flow rate can be re-expressed as a volumetric flow rate $$\dot{V} = \frac{PRT}{PN_aW} \quad (3)$$

where $\dot{V}$ is the volumetric flow rate, R is the universal gas constant, and P=1 atm and T=273 K for I $\dot{V}$ units of sccm.

The ion cost depends on the propellant, but a typical number of 60 eV/ion can be assumed for this example. In this case the volumetric flow rate is 12 sccm which corresponds to 1.1 mg/s of xenon. The flow into the thruster must be balanced by flow out in steady state. The molecular rate into the thruster for full ionization is $$\dot{N}_{in} = \frac{P}{W} \quad (4)$$

The molecular rate out of the thruster is determined by the plasma which exits at the sound speed ($c_s$=sqrt ($T_e$/mi)) where $T_e$ is the electron temperature and $m_i$ is the ion mass)

$$\dot{N}_{out} = n_e c_s A_e \quad (5)$$

where $A_e$ is the exit area. If an electron temperature of 10 eV is assumed (which is reasonable in laboratory experiments) with xenon as the ion species then the electron density can be determined, which is $10^{14}$ cm$^{-3}$ for CAT's exit area.

The necessary magnetic field strength for helicon wave propagation is given by solving the dispersion relation:

$$B = \frac{e\mu_0 n_e L_A \omega}{\pi \sqrt{\left(\frac{\pi}{L_A}\right)^2 + \left(\frac{3.83}{a}\right)^2}} \quad (6)$$

For CAT's antenna design the magnetic field strength is about 800 G, the critical input for magnet design. As mentioned above, density is proportional to magnetic field strength, so higher magnetic field strength allows for higher thrust. Electromagnets require far too much power for practical use on a CubeSAT, so permanent magnets were chosen.

The plasma inside the thruster is expected to have electrons with a temperature of 5 to 20 eV and cold ions, based on prior work. The electrons are magnetized and much faster than the ions, so they rush out of the thruster along the magnetic field lines. This establishes an electric field which accelerates the ions. This is known as ambipolar ion acceleration. The electrons cool in the acceleration region and transfer their thermal energy to ion directed kinetic energy. The initial electron temperature is much larger than the final temperature, so the ion energy can be approximated as $$E_{ion} = \gamma T_e \quad (7)$$

where $\gamma$=2 is the adiabatic index of this two degree of freedom system. From this equation, a rough estimation of $I_{sp}$ can be calculated: 400 to 800 s for xenon propellant.

The electric power into the thruster (P) goes into the ion kinetic energy or ion cost, which by definition includes all energy modes other than ion kinetic energy. Therefore, the maximum possible efficiency of the thruster (no is $$\eta_t = \frac{E_{ion}}{W + E_{ion}} \eta_n \quad (8)$$

where $\eta_n$ is the nozzle efficiency and equals about 0.9 in CAT, using the conservative assumption of uniform density as a function of radius. As mentioned before, W depends on both the propellant and the device, but values of about 60 eV are typical. Thus, the thruster efficiency is expected to be 10% to 40%. Thrust (T) can then be calculated as $$T = \frac{2\eta_t P_{rf}}{I_{sp} g_0} \quad (9)$$

where $g_0$ is Earth's gravitational acceleration. The thrust is expected to be 0.5 to 4 mN.

To estimate the $\Delta V$ the CAT engine could provide, assume a 3U CubeSAT where the thruster mass is 1 kg, the propellant tank is 0.3 kg, the propellant is 0.7 kg, and the rest of the CubeSAT is 1 kg. With $I_{sp}$s between 400 and 800 s, after using all of its propellant the satellite would have a $\Delta V$ of 1-2 km/s, large enough to enable many of the new missions mentioned above.

Key Components

Figure 2:
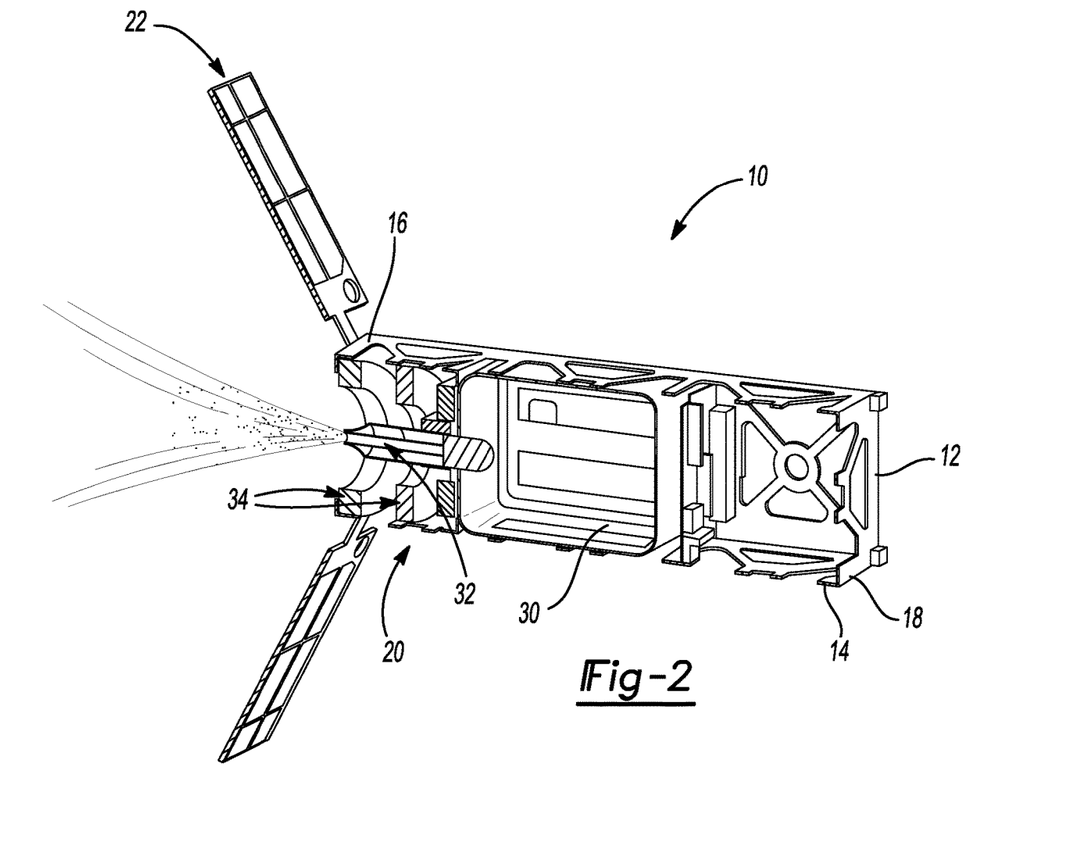
FIG. 2 is a partial cross-sectional view of a CubeSAT Ambipolar Thruster (CAT) according to the principles of the present teachings.

With particular reference to FIG. 2, the CAT 10 according to the principles of the present teachings can comprise, in some embodiments, a frame structure 12 having a forward or first end 14 and a rear or second opposing end 16. Frame structure 12 can define a cargo section 18, a thruster system 20, and an alternative power system 22.

In some embodiments, frame structure 12 is sized in accordance with CubeSAT characteristics set forth herein. In some embodiments, frame structure 12 is sized as a 3 U CubeSAT having about 1 U for spacecraft controls, 0.5 U to 1.0 U for instrumentation, and a remaining portion for thruster system 20 (specifically, about 0.6 U for thruster and 0.4-0.9 U for propellant tank).

Figure 3:
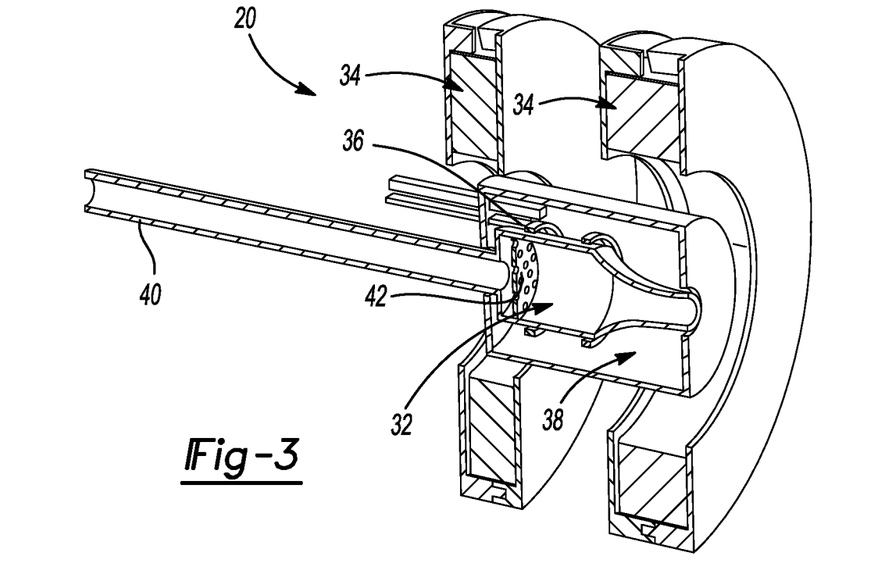
FIG. 3 is a partial cross-sectional view illustrating a magnetic nozzle system according to the principles of the present teachings.

In some embodiments, as illustrated in FIG. 3, thruster system 20 can comprise a propellant tank 30 (FIG. 2), a plasma liner 32, at least a pair of radially-oriented magnets 34, a helicon RF antenna 36, a faraday shield 38, and a propellant line 40 interconnecting propellant tank 30 to plasma liner to permit the flow of propellant therethrough.

Gaseous propellant flows from propellant tank 30 into plasma liner 32, which is a quartz, bottle-shaped tube where the gas is ionized into a plasma and heated. Quartz was chosen because of its low conductivity and ability to survive high temperatures. At pressures of ones of Torr, the gas is on the border between free molecular flow and collisional flow, so just past the expansion point a "shower-head" gas distributor 42 (FIG. 3) was included to disperse the gas into plasma liner 32 in a more uniform radial profile. The shower head gas distributor 42 has the added benefit of acting as an isolator, reducing the plasma that could propagate upstream and affect the valves and other components.

The diameter of plasma liner 32 and nozzle were designed to optimize both the mass flow rate and the pressure in plasma liner 32. The flux of propellant into plasma liner 32 should match the flux of plasma out to maximize propellant utilization. The pressure in plasma liner 32 was chosen to provide the correct neutral density (i.e. equal to the plasma density). If the pressure was too high the electrons would collide before acquiring their maximum energy. If the pressure was too low they would traverse the entire plasma liner without making a collision. Even after the plasma is ignited, once the RF coupling becomes inductive or wave, the high energy ionizing electrons need to make their collisions within plasma liner 32 for optimal performance.

The RF antenna 36 was a helical half-twist geometry designed to excite an m=+1 helicon wave. The antennae for the initial experiments were 3D printed out of solid silver. Future designs will use electroplated silver on another stronger, less expensive metal, but solid silver allowed for rapid iteration of designs in the prototype phase. The wire diameter was 2 mm thick, balancing material cost with structural stability.

Although electromagnets are versatile, considering that the field strength can be varied, they require a significant amount of power to operate. On CubeSATs, power is at an even greater premium than conventional satellites, so permanent magnets 34 were used to generate the magnetic nozzle. In some embodiments, neodymium (NeFeB) rare earth magnets with strength 42 MGOe can be used. Neodymium magnets suffer, though, from a relatively low Curie temperature of about 150° C., beyond which they become demagnetized. Samarium cobalt (SmCo) magnets are weaker, but have a higher Curie temperature (about 300° C.) and may be used in future versions of CAT. Carefully designed annular magnets 34 were used to generate the magnetic nozzle which facilitates conversion of thermal energy to directed kinetic energy in the plasma.

Figure 4:
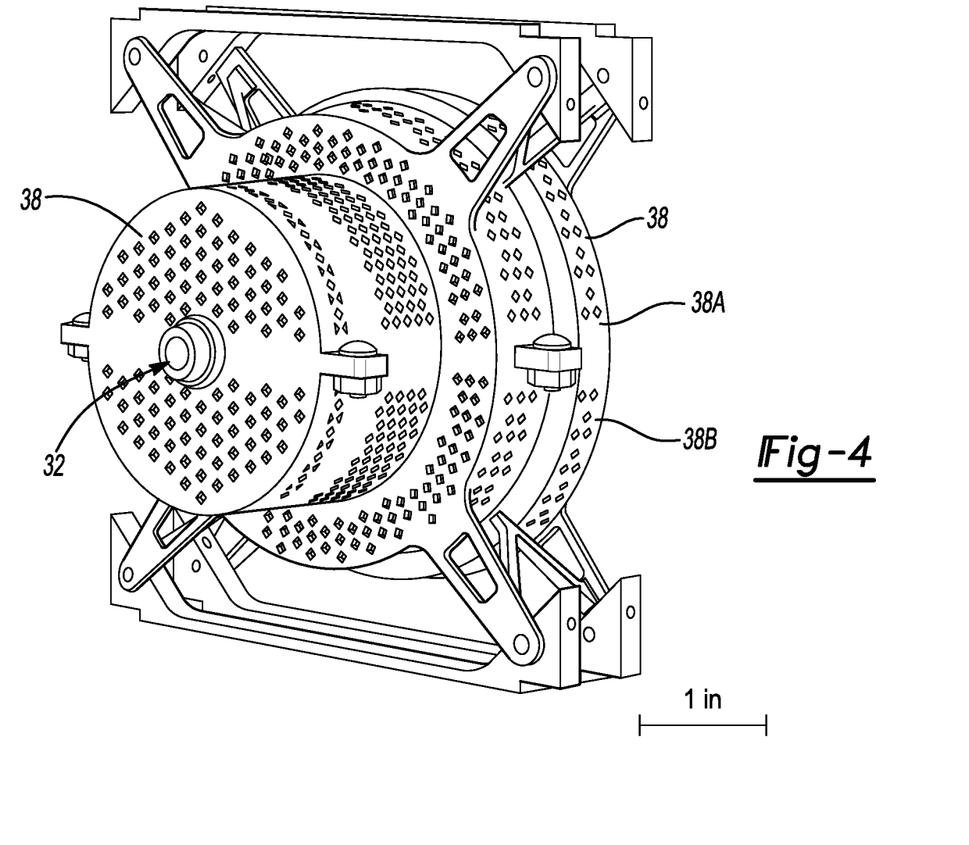
FIG. 4 is a perspective view of a Faraday shield.

The magnets 34, plasma liner 32, and antenna 36 were contained and supported in a Faraday shield or cage 38 (see FIGS. 3 and 4). The Faraday shield 38 consists of two identical 3D printed titanium clam shells 38A, 38B. Supporting the magnets 34 is critical because the forces between them can be up to 50 N. But the primary role of the shield 38 is to contain the radio frequency energy from the antenna 36, which could affect other parts of the spacecraft. Titanium was chosen because it is 3D printable, comparatively low density, high strength, and conductive so as to better contain the RF. The holes in the outer shell 38 allow some observation of the interior for testing, but could be replaced with a solid version in an engineering model. Once assembled, the eight protruding legs 50 get attached to rails appropriate for the specific CubeSAT bus. The assembly shown was designed for integration with a RAX-like bus which will be the vehicle for the first on orbit test. The full assembly has a mass of 0.5 kg, which does not include the RF power supply, the propellant, or tank.

Magnetic Field

Magnetic nozzles have traditionally been generated with solenoid-like coils of wire, called electromagnets. A denser packing of electromagnet coils in a region of space creates a higher magnetic field strength and also causes a magnetic throat to form. These electromagnet coils, however, require significant electrical power to sustain the magnetic field, and may also require active cooling in order to get rid of the waste heat generated by Joule heating (a process that occurs when electrical current passes through a conductor with a non-zero resistance).

Figure 5:
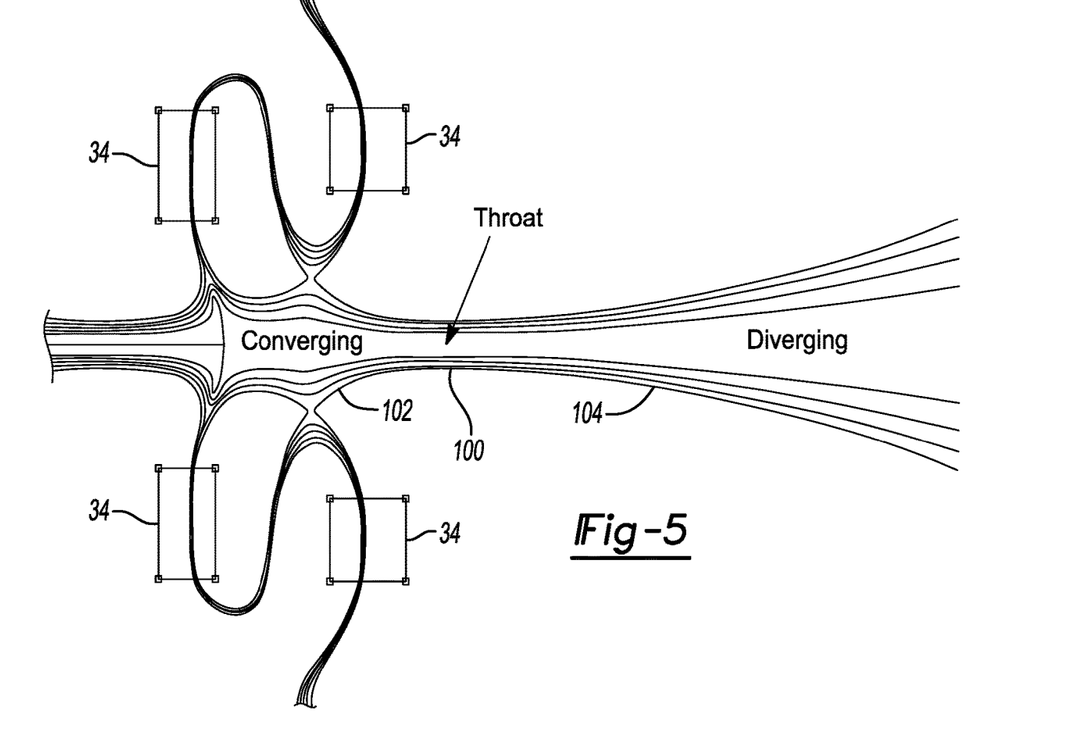
FIG. 5 is a schematic illustrating a portion of the magnetic field lines of a plasma magnetic nozzle according to the principles of the present teachings.
Figure 6:
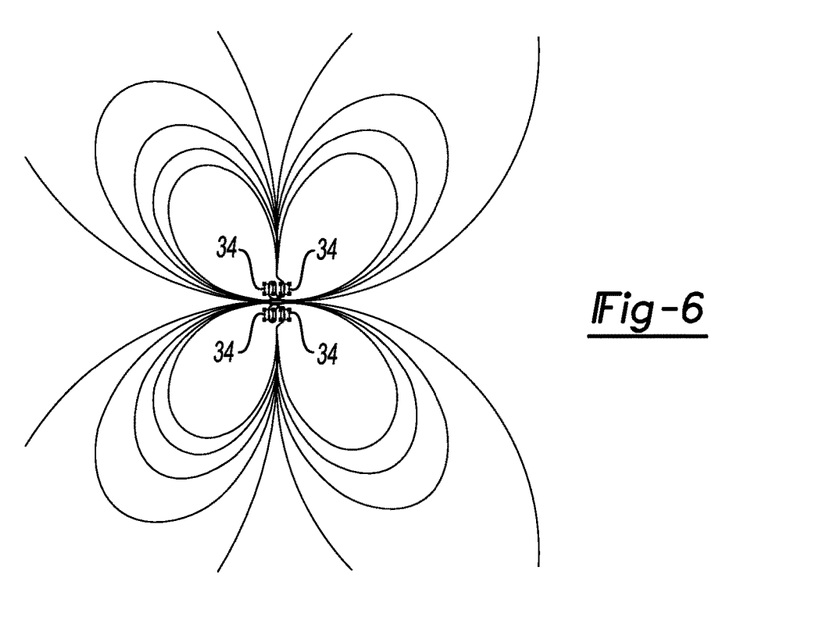
FIG. 6 is a schematic illustrating the magnetic field lines of the plasma magnetic nozzle according to the principles of the present teachings.

The converging/diverging magnetic nozzle presented here is constructed from permanent magnets 34, allowing the magnetic nozzle to be sustained with no input power, no control electronics, and also no waste heat. Two or more dissimilar, radially magnetized/oriented, annular permanent magnets 34 can be used to generate this magnetic field (see FIG. 5). FIG. 5 is axisymmetric. The lines indicate magnetic flux lines and were calculated using a finite element field solver. This same design is shown in FIG. 6, though zoomed out.

Figure 7:
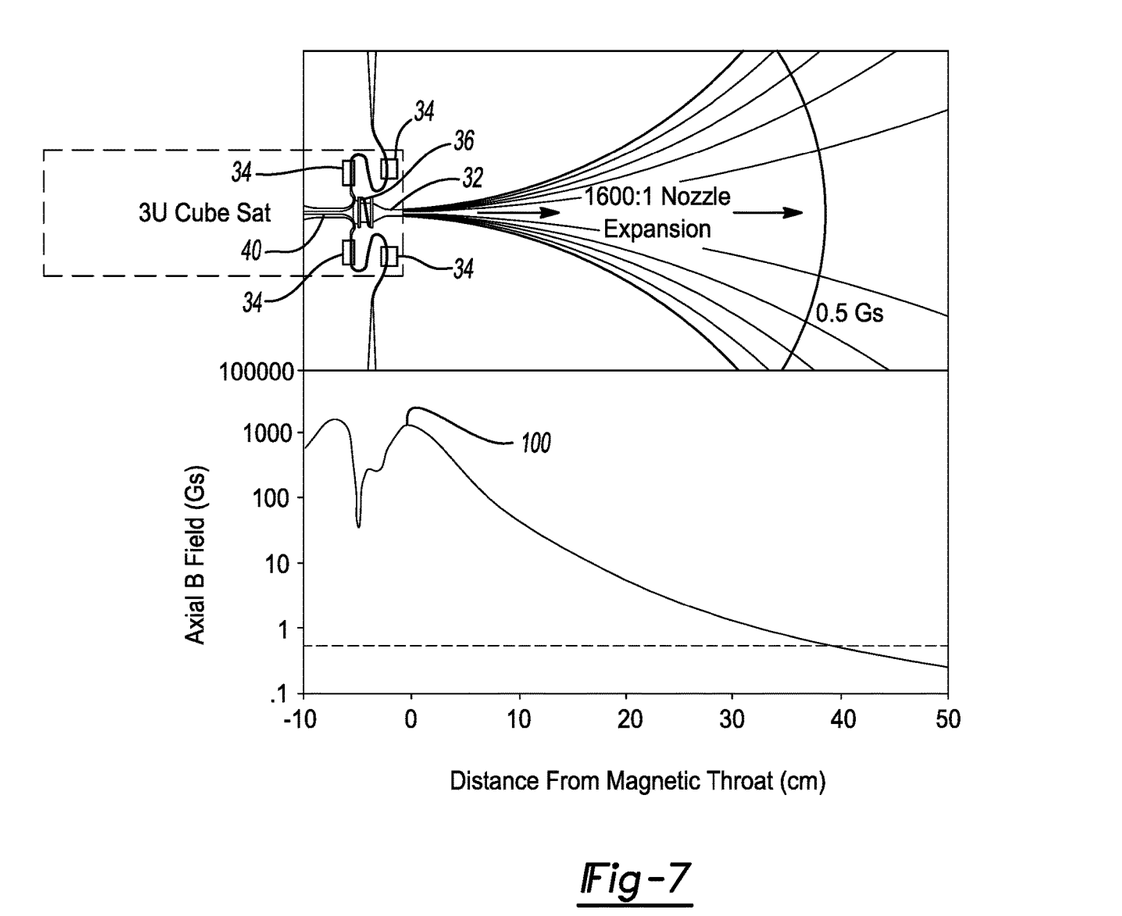
FIG. 7 is a graph and schematic view illustrating the relative positioning of the magnets and corresponding magnetic field.

The relative magnetic field strength along the axis of the device is shown in FIG. 7 with the field strength graph being positionally aligned with the schematic 3 U CubeSAT and magnets 34 of the representation above. The throat 100 can be identified as the maximum in the magnetic field strength to the right of the permanent magnets, thereby defining a convergent section 102 to the left of the throat 100 and a divergent section 104 to the right of the throat 100. It should be understood that the boundaries of the "nozzle" are defined by the magnetic field and not by physical structure of plasma liner 32.

In some embodiments, the nozzle comprises convergent section 102 having an entrance for receiving a particle, which defines a first operational boundary thereabout. Throat section 100 is disposed downstream of the convergent section 102, and defines a second operational boundary thereabout that is less than the first operational boundary. Divergent section 104 is disposed downstream of throat section 100 for outputting the particle. Divergent section 104 defines a third operational boundary thereabout, which is greater than the second operational boundary. The thruster or magnetic field system outputs magnetic field lines about at least throat section 100 whereby the magnetic field lines restrict movement of the particle thereby defining the second operational boundary, wherein the convergent section 102, the throat section 100, and the divergent section 104 collectively receive and accelerate the particle from the entrance to the exit.

It should also be understood that in addition to normal conducting electromagnets, superconducting electromagnets can be used, although control electronics and temperature controls may be used in connection with superconducting electromagnets. It should also be understood that radially and axially magnetized magnets and just axially magnetized magnets can be used.

In some embodiments, it can be difficult and costly to produce large, radially-oriented ring magnets. In such cases, it is possible to use radially oriented segmented arc magnets arranged to form the annulus. Using a minimum of six segments does not significantly change the magnetic field structure and does not introduce significant axi-asymmetry.

The magnets 34 were designed using FEMM, a finite element magnetic field solver, to create an optimum magnetic field for CAT's operation. Once the thruster 10 employing these magnets 34 was constructed, its magnetic field was measured using a three-axis magnetometer with 0.01 G resolution. Because the magnetometer measurement head was larger than the plasma liner exit only the external magnetic field could be measured. Even if plasma liner 32 was removed, simulations showed that the internal magnetic field varied significantly over distances of the size of the measurement head so internal measurements would be questionable at best.

Figure 8:
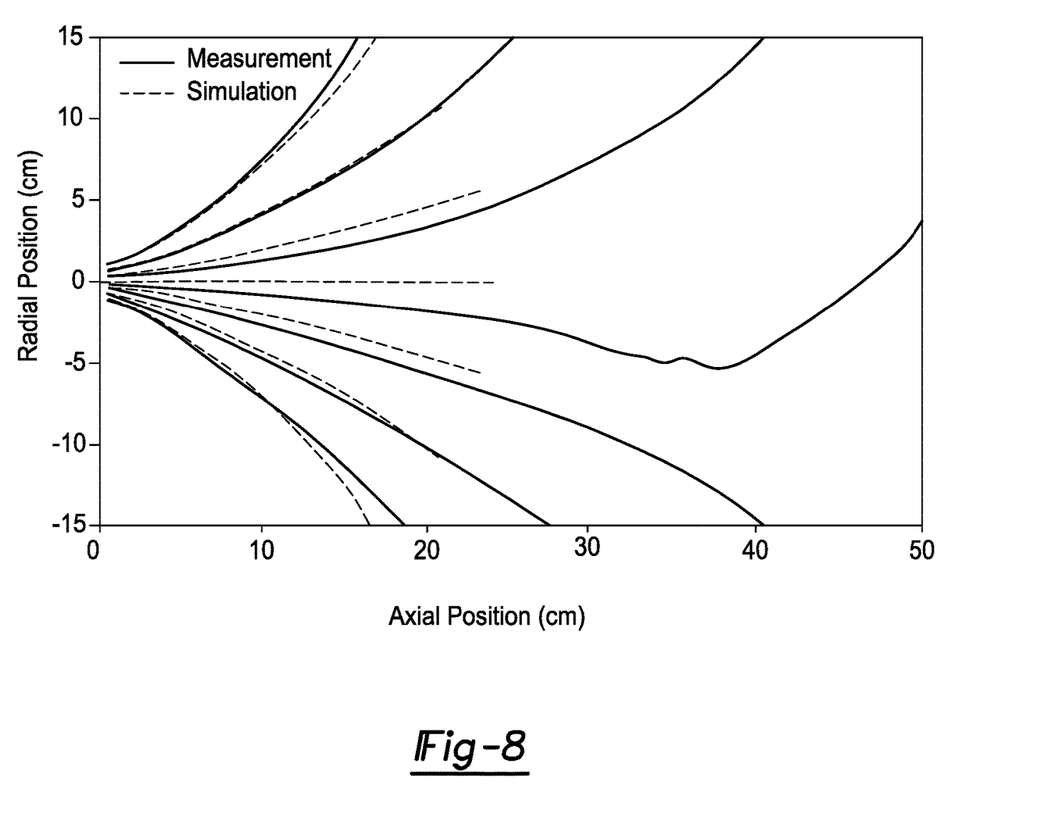
FIG. 8 is a graph illustrating radial position versus axial position of measured and simulated magnetic field lines.

The magnetic field was measured in a 40 cm by 50 cm grid with 0.5 cm spacing in front of the thruster (i.e. in the region of the plasma plume). The magnetic field lines from the measurements and from the simulations are overlain in FIG. 8. The measurements match the simulations very well to within 5% (the percent deviation in field strength at a given point). Some of the variation comes from uncertainty in the direction in which the thruster was pointed and the absolute position at which the measurements were made. One particularly interesting feature of the measurements is at 40 cm axial distance from the thruster where the field line suddenly changes direction. This is the point at which CAT's magnetic field drops below Earth's magnetic field (about 0.5 G) and Earth's magnetic field dominates. This measurement confirms the simulations' predictions that CAT's magnetic field has a practical extent of 40 cm. This is critical for realistic thruster testing where the vacuum chamber wall effects can be minimized.

Propellants

Central to CAT's design is that there are no electrodes exposed to plasma and the magnetic field keeps the plasma away from the plasma liner. These features allow CAT to be operated with not only conventional electric thruster propellants (xenon and krypton), but also novel propellants such as oxidizers or metals that would corrode or short circuit other thrusters. Xenon is most often used because it is inert and has a high mass, a low ionization potential, and a large cross section. Xenon, however, is becoming less economical and as a gaseous propellant has a low storage density. Solid- or liquid-storable propellants are of particular interest because of higher storage density, critical in CubeSATs where volume is at a premium.

Iodine is a promising candidate due to its high storage density and low cost. Iodine and xenon have several advantageous similarities which may mean similar operation in CAT. They could provide similar thrusts and specific impulses because their atomic masses are so close (I: 126.9 amu; Xe: 131.3 amu). Iodine is a diatomic molecule as a solid and must be dissociated (1.54 eV dissociation energy) before the atoms can be ionized (10.5 eV ionization energy). The sum of these two energies is 12.0 eV, very close to xenon's ionization energy of 12.1 eV. A key difference, though, is the rotation and vibration modes of $I_2$ which could be an energy sink and reduce efficiency.

One of iodine's key features that makes it promising is its relatively high vapor pressures at temperatures reasonable for a spacecraft (see FIG. 6). To provide 1 Torr in the plasma liner, tank pressures need to be in the mid-1 s of Torr which can be attained by heating the tank to 50 to 70° C. This can be achieved with a combination of passive heating and thermoelectric heaters. The feed lines will have to be heated to maintain the desired mass throughput.

Iodine is corrosive toward materials commonly found in satellites. This oxidation-reduction reaction tends to cause coating and breakdown of metals and brittleness or swelling in some elastomers. Table 2 outlines the compatibility of iodine with commonly used materials. The propellant feed modules being developed will utilize materials with high ratings, and component- and system-level tests will be conducted to verify the compatibility of the materials selected. The ratings were determined by visual observation over the course of up to 48 hours. Iodine must be used with care, but in Hall thrusters have been successfully operated using it as a propellant, so it is a viable option for CAT.

It should be understood that the principles of the present teachings can be used with a wide variety of propellants, including, but not limited to: Bi, (Bismuth); Hg, (Mercury); Ga, (Gallium); In, (Indium); Pb, (Lead); Sn, (Tin); I2, (Iodine); Galinstan, (A eutectic mixture of low melting temperature metals); any other mixture of low melting temperature metals (examples are:

Field's metal, Roses's metal, Wood's metal, NaK); H, (Hydrogen); He, (Helium); Ne, (Neon); Ar, (Argon); Kr, (Krypton); Xe, (Xenon); H2O, (Water); NH3, (Ammonia); SO2, (Sulfur Dioxide); SF6, (Sulfur Hexafluoride); CO2, (Carbon Dioxide); Ionic liquids (AF-M315E is one example); NO, (Nitric Oxide); N2O (Nitrous oxide); NO2 (Nitrogen dioxide); N2H4 (Hydrazine); Phosphoric acids; H2O2 (hydrogen peroxide); metal peroxides; peroxides; H2O+Iodine (aqueous solution containing iodine); H2O+Potassium (aqueous solution containing iodine); H2O+Potassium+Iodine (aqueous solution containing potassium and iodine); and/or H2O+any other salt.

Conclusion

The CubeSAT Ambipolar Thruster is an electrodeless plasma thruster designed for primary propulsion on CubeSATs. A helicon wave couples RF energy into the plasma which accelerates through a magnetic nozzle. It has been designed to operate at up to 50 W and produce mNs of thrust with higher thrust levels possible (up to 200 W tested). Many of CAT's parts make use of 3D printing technology which allows for rapid iteration and the manufacture of precision parts that could not otherwise be machined. The magnetic nozzle was simulated using a finite element solver, the results of which were verified to within 5% of measured values. Using xenon, CAT was fired for the first time, providing a baseline for future testing. Some of these future tests will involve investigating iodine as a possible propellant. Iodine shows promise as a high performing, solid-storable propellant, enabled by CAT's electrodeless design.

A total thruster efficiency>40% is expected with some propellants, exceeding the efficiency, total thrust, thrust to power, and total delta-V of other primary propulsion technologies such as micro Ion or Hall thrusters. The CAT can be easily manufactured with off the shelf components and tested in the U. Michigan vacuum chambers. The CAT engine can be operated at 10 W (100 W pulsed), since up to 50 W has already been demonstrated for CubeSats in orbit. An $I_{sp}$=1300 s delivers the largest thrust/power ratio for Iodine propellant. The CAT design is expected to provide a thrust of 2 mN at 10 W and an $I_{sp}$ between 1200-2000 s, in a 1 U volume, two orders of magnitude greater than state-of-the-art capabilities.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A nozzle system for accelerating a plasma particle therethrough, said nozzle system comprising: a plasma liner configured to receive a propellant at an upstream entrance of the plasma liner and output the plasma particle at a downstream exit of the plasma liner;
an antenna surrounding said plasma liner and configured to produce an inductive plasma comprising said plasma particle; and
first and second radially-disposed magnets surrounding said plasma liner outputting a magnetic field having a magnetic field strength and defining a flow boundary that extends downstream of the downstream exit of the plasma liner,
wherein said first and second radially disposed magnets are configured to define a convergent section within an antenna-surrounding portion of the plasma liner, a throat section downstream of said convergent section, and a divergent section downstream of said throat section and extending beyond the downstream exit of the plasma liner, wherein the first and second radially-disposed magnets include non-overlapping axial extensions, each radially-disposed magnet of said first and second radially-disposed magnets comprising an annular radially-magnetized permanent magnet;
wherein a throat section flow boundary is smaller than a converging section flow boundary;
wherein the magnetic field strength is continuously reduced downstream from the throat section; and
wherein the nozzle system is configured to accelerate plasma ions by ambipolar ion acceleration.

2. The nozzle system according to claim 1 wherein the first radially-disposed magnet of the first and second radially-disposed magnets is dissimilar to the second radially-disposed magnet of the first and second radially-disposed magnets.

3. The nozzle system according to claim 1 wherein a location of a maximum value of said magnetic field strength represents said throat section, said location being disposed at, or downstream of, the downstream exit of the plasma liner.

4. The nozzle system according to claim 1 wherein the nozzle system does not contain an ion cyclotron.

5. The nozzle system according to claim 1, wherein said magnetic field is axisymmetric about a longitudinal axis of the plasma liner.

6. The nozzle system according to claim 1, wherein the nozzle system is electrodeless.

7. The nozzle system according to claim 1, wherein said plasma liner is a bottle-shaped tube that is fabricated from quartz.

8. The nozzle system according to claim 7, wherein a diameter of the bottle-shaped tube at the upstream entrance is larger than a diameter of the bottle-shaped tube at the downstream exit.

9. The nozzle system according to claim 8, wherein the throat section flow boundary at the downstream exit of the plasma liner has a diameter that is smaller than the diameter of the bottle-shaped tube at the downstream exit.

10. A plasma thruster for producing a thrust comprising:
an upstream plasma generator configured to produce an inductive plasma;
a downstream thrust-producing end; and
first and second radially-disposed magnets disposed between the plasma generator and the downstream thrust-producing end, wherein the first and second radially-disposed magnets are configured to produce a magnetic field between the plasma generator and the downstream thrust-producing end that extends downstream of a downstream exit of the plasma thruster, the magnetic field comprising
a convergent section having an entrance for receiving the inductive plasma generated from the plasma generator, said convergent section defining a first operational boundary cross-section thereabout,
a throat section downstream of said convergent section, said throat section defining
a second operational boundary cross-section thereabout, said second operational boundary cross-section being less than said first operational boundary cross-section, and
a divergent section downstream of said throat section and open at the downstream thrust-producing end, said divergent section defining a third operational boundary cross-section thereabout, said third operational boundary cross-section being greater than said second operational boundary cross section;
wherein the first and second radially-disposed magnets include non-overlapping axial extensions, each radially-disposed magnet of said first and second radially-disposed magnets comprising an annular radially magnetized permanent magnet;
wherein said magnetic field has a magnetic field strength that is continuously reduced downstream from said throat section and configured to output a plasma particle at the downstream thrust-producing end; and
wherein the thruster is configured to accelerate plasma ions by ambipolar ion acceleration.

11. The plasma thruster according to claim 10 wherein the magnetic field restricts movement of the inductive plasma thereby defining said second operational boundary cross-section.

12. The plasma thruster according to claim 10 wherein the first radially-disposed magnet of the first and second radially-disposed magnets is dissimilar to the second radially-disposed magnet of the first and second radially-disposed magnets.

13. The plasma thruster according to claim 10 wherein the throat section comprises a maximum magnetic field strength that is disposed at, or downstream of, the downstream exit of the plasma thruster.

14. The plasma thruster according to claim 10 wherein the upstream plasma generator comprises a radio frequency (RF) source outputting an RF field generating plasma.

15. The plasma thruster according to claim 14 wherein said RF source comprises a helical half-twist antenna.

16. The plasma thruster according to claim 14 wherein said RF source produces an RF wave having a frequency of 6.78 MHz.

17. The plasma thruster according to claim 14 wherein said RF source produces an RF wave having a frequency of 13.56 MHz.

18. The plasma thruster according to claim 14 wherein said RF source produces an RF wave having a frequency of 27.12 MHz.

* * * * *

UNITED STATES PATENT AND TRADEMARK OFFICE
CERTIFICATE OF CORRECTION

PATENT NO. : 11,325,727 B2
APPLICATION NO. : 14/914056
DATED : May 10, 2022
INVENTOR(S) : Benjamin Longmier et al.

It is certified that error appears in the above-identified patent and that said Letters Patent is hereby corrected as shown below:

In the Specification

At Column 4, Detailed Description, Line number 30, delete " $\frac{c^2 k^2}{\omega^2} = \frac{\omega_p^2}{\omega \omega_c \cos\theta}$ " and insert -- $\frac{c^2 k^2}{\omega^2} = \frac{\omega_p^2}{\omega \omega_c \cos\theta}$ --.

At Column 5, Detailed Description, Line number 37, after "for", delete "I".

At Column 6, Detailed Description, Line number 27, delete "(no" and insert -- ($\eta_t$) --.

At Column 10, Detailed Description, Line number 19, after "are:", delete "¶".

Signed and Sealed this
Nineteenth Day of July, 2022

Katherine Kelly Vidal
*Director of the United States Patent and Trademark Office*